Figure 1:

July 14, 1936.     W. H. CONRON     2,047,617
APPARATUS FOR TESTING INDUCTANCES
Filed May 31, 1934     2 Sheets-Sheet 1

INVENTOR
William H. Conron

ATTORNEY

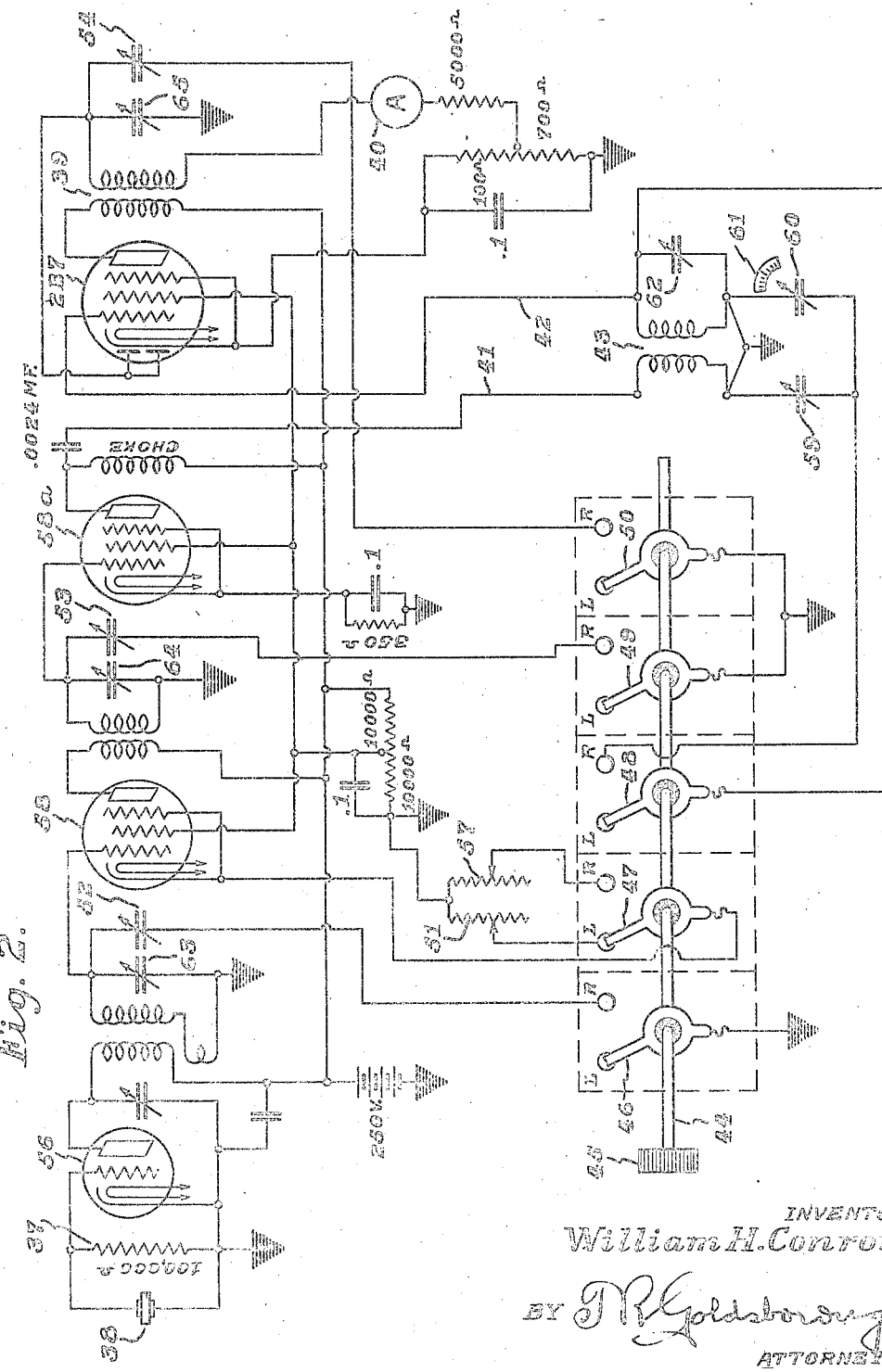

Patented July 14, 1936

2,047,617

UNITED STATES PATENT OFFICE 2,047,617

APPARATUS FOR TESTING INDUCTANCES

William H. Conron, Riverton, N. J., assignor to Radio Corporation of America, a corporation of Delaware Application May 31, 1934, Serial No. 728,255

9 Claims. (Cl. 175—183)

This invention relates to testing apparatus and more particularly to a device for conveniently matching inductance coils to insure uniformity in their characteristics.

In the manufacture of radio frequency coils for use in radio apparatus and devices of that character, it is essential that the inductance value of the coils be held within very close limits. This is also desirable not only from the standpoint of interchangeability of the coils themselves, but because coils which are suitably matched can be lined up in a radio set with dexterity and with greater assurance that the set will operate efficiently.

Accordingly, it is an object of my invention to provide testing apparatus in which a plurality of inductances may be successively compared with the inductance of a standard coil.

Another object of my invention is to provide apparatus of the class described in which the matching of radio frequency coils may be accomplished with dexterity and independently of the distributed capacity values of the coils themselves.

The foregoing and other objects and advantages of my invention will be more clearly brought out in the description to follow. This description may also be relied upon to obtain a better understanding of the invention in its entirety and with respect to the details of construction thereof, reference being had to the accompanying drawings, in which Figure 1 is a schematic diagram of one embodiment of my invention comprising two oscillators and other apparatus for producing audible beat frequency notes as a result of comparing a coil under test with a standard coil; and Figure 2 is a diagram showing a modification of my invention in which tests of inductances may be made upon reference to a visual indicator such as a vacuum tube voltmeter.

Referring to Fig. 1, the structure of my invention includes essentially two oscillators, a detector, an amplifier, a loud speaker and switching apparatus by means of which either one of two radio frequency transformers may be alternatively included in the circuit for matching their inductance characteristics. The oscillator A is conventionally shown because it may be of any desired type. It is preferably adapted to produce oscillations of a fundamental frequency within the frequency spectrum to be served by the transformer coil under test. If, however, the fundamental frequency is too low, then harmonics thereof may be used. Assuming, for example, that the oscillator A is adjusted to produce a wave of 600 kilocycles, it will, of course, be understood that by tuning the output circuit thereof to any harmonic of that frequency, such harmonic may also be utilized.

A second oscillator B is represented within the broken line rectangle shown in Fig. 1. Preferably, this oscillator is of the so-called Roberts type. For such an oscillator, a vacuum tube 11 may be used which is preferably of the type known as 2A7. This tube has a cathode 12, an anode 13 and four grids 14, 15, 16 and 17, respectively. By inserting a suitable capacitance 18 in circuit between the grids 15 and 17, and by impressing suitable potentials upon the various elements of the tube, it is caused to oscillate and will supply a frequency depending upon the resonant characteristics of the network fed by conductor 19. This network may be caused to include either one or another tank circuit, according as a standard transformer 20, or a transformer 21 to be compared therewith, is switched in. In shunt with the secondary of the transformer 20 is a variable condenser 22. Also, in shunt with the secondary of the transformer 21 is a variable condenser 23. The primary of either the transformer 20 or of the transformer 21 may be caused to have substantially the same reactance as it would have, for example, when placed in service in a radio receiver, by placing in shunt with said primary a suitable capacitance constituting the variable condenser 24.

For convenience in quickly transferring the output circuit 19 alternatively to one or another of the tank circuits as shown, I preferably employ switching means such, for example, as what is commonly known in the telephone art as a listening and ringing key. In this case, however, my switch has a symmetrical contact spring pile-up. On the one hand the pile-up consists of movable springs 25, 26 and 27; on the other hand it consists of springs 25a, 26a and 27a. Each of the movable springs has a stationary companion spring with which it makes contact. The operation of the key switch will be further explained when the process of testing inductance coils or transformers is hereinafter brought out. In order that the resonance characteristics of the tank circuits may be further modified, I provide still another variable condenser 28 to which they may be connected through a switch 29. By closing this switch the condenser 28 is put in parallel with either of the two condensers 22 or 23.

Heterodyning of the oscillators A and B is accomplished through a network which includes the two coupling condensers 30, a volume-control device 31, a detector 32, a coupling condenser 33, an amplifier 34, an audio frequency transformer 35 and a suitable responsive device or loud speaker 36.

The process of comparing two transformers 20 and 21 in order to exhibit their relative inductance values is as follows: The oscillator A will be assumed to be tuned to a fundamental frequency of 600 kilocycles. The double-throw switch is first thrown to the left thereby closing the contacts 25, 26 and 27 against their respective companion contacts. The switch 29 is at this time left open because it is desired first to make the tank circuit, including the secondary of the standard coil 20 and the variable condenser 22 resonate at, say, 1200 kilocycles, which is the second harmonic of the frequency of oscillator A. The tuning condenser 22 is, therefore, adjusted to this condition as will be noted by the disappearance of the audible beat note from the heterodyning of oscillators A and B. At the time of making this test, the secondary coil of transformer 21 is short circuited by virtue of the grounding of both terminals, one of which goes through contact spring 26 and its companion. Furthermore, the primary winding of the standard transformer coil 20 is placed in shunt with the condenser 24 by virtue of the closing of contact 25 against its companion. As can readily be seen, the condenser 24 may be adjusted to provide any suitable reactance characteristic commensurate with what would be met with in the practical use of the transformer.

The conditions to which the transformer 20 and its tuning condenser 22 have now been adjusted can be duplicated on the right hand side of the test set which includes the transformer 21 under test. The double-throw switch is, therefore, moved to the right, thereby opening the contact springs on the left hand side, and closing those, namely 25a, 26a and 27a, on the right hand side against their companion contacts.

To produce a desired resonant characteristic in the tank circuit now fed by conductor 19, the tuning condenser 23 will be adjusted so that the secondary of the transformer 21 in co-operation therewith will assume a resonant point for which the second harmonic of oscillator A and the fundamental frequency of oscillator B will produce a zero beat frequency. The audible beat note will then disappear. The two tank circuits, namely those which include the standard coil and coil under test respectively will now have been adjusted to like conditions of resonance. It will be seen that while the coil 21 is under test, its primary may be placed in circuit with the tuning condenser 24 and the latter will remain in the same position to which it was set when the standard coil was under test. In this way, the primary of the coil 21 will offer the same reactance to its secondary as was obtained in respect to the primary and secondary of the standard coil 20. Furthermore, when the coil 21 is under test, the secondary of the coil 20 will be short-circuited by the closing of contact 26a against its grounded companion. As nearly as possible, therefore, the working conditions in a radio receiver will be duplicated by the set-up of the standard coil and the coil under test.

The next step in the procedure is to match the inductance values of the coils at a different frequency. The switch 29 is now closed and again the standard coil 20 is placed in circuit with the conductor 19. By adjustment of the tuning condenser 28, the oscillator B can be made to resonate at 600 kilocycles, which is the fundamental frequency of the oscillator A. This is accomplished without changing the adjustment of the tuning condenser 22.

Finally, the double-throw switch is again moved to the right to determine whether the coil 21 under test has the same inductance characteristics at this lower frequency. If so, a zero beat note will result and by varying the setting of the tuning condenser 28 slightly one way or the other, the beat note will again become audible. If the inductance is not the same, an audible beat note will be heard, unless it is so far different that the beat note is above the audible range, in which event the note may be found by changing the adjustment of the condenser 28 in one direction or the other until it is heard. If the capacitance of the condenser is increased for zero beat response, that means that the inductance of the coil under test is too low compared with that of the standard coil 20. Correspondingly, if the capacitance of the condenser 28 has to be reduced in value, the inductance of the coil under test is too high. It is the practice, therefore, at this point to either bring the convolutions of the coil under test a little bit closer together or to spread them apart so as to vary the inductance thereof. After making such a change in the adjustment of the coil under test, the testing operation as hereinbefore described can be repeated until finally the coil is satisfactorily matched with the standard.

Referring now to Fig. 2, I show a modification of my invention in which only one oscillator is employed and with which it is desirable, therefore, to employ visual indicating means for making the tests. An instrument is preferably used which responds directly to the flow of plate-current in a vacuum tube amplifier. Preferably also, a piezo-electric crystal-controlled oscillator of any suitable type is included in this circuit. The vacuum tube 56 may be a triode commonly known as type 56, or any other suitable electron tube may be used, if desired. The grid of this tube is self-biased through the resistor 37. In shunt therewith, I preferably employ a piezo electric device 38. The output of the oscillator is fed successively to a network comprising an amplifier 58, a detector 58a, thence through a transformer which is to be tested and to the tube 2B7. The output circuit of this last tube includes the primary of the transformer 39. The secondary of this transformer is in circuit with an indicating instrument 40 constituting, preferably, a hot-wire ammeter having a range, for example, of, say 200 microamperes.

The usual details of a circuit such as just now described are conventional and for this reason it appears unnecessary to direct attention to the precise details thereof, except insofar as they relate to the particular means by which the objects of my invention are carried out. It will be seen, however, that I preferably employ conductors 41 and 42 between the tube 58a and the tube 2B7 so that the transformer coil 43 to be tested may readily be inserted in the network as a coupling device between the detector and amplifier. According to my invention certain switching arrangements are provided whereby either the fundamental frequency of the oscillator and one of its harmonics or any two harmonics may be utilized in testing the coil 43. I preferably employ a five-pole double-throw switch, each contact blade of which is suitably shielded electrostatically from the others. In fact, in accordance with a preferred embodiment of my invention, this shielding is so disposed that each of several portions of the switching device is in the same compartment with a related vacuum tube and its network. Other shielding compartments are provided for elements of the switching device which are unrelated to the respective stages. It will be understood, therefore, that the conventional showing of shielding as by the broken-line rectangles is one which in practice will be so constituted as to suitably shield one stage of amplification or detection from another.

The switching device just now referred to comprises a shaft 44 at one end of which I preferably mount a control knob 45. Carried on the shaft and insulated therefrom are the contact blades 46, 47, 48, 49 and 50. Each of these blades makes contact respectively with a left hand and a right hand contact point L or R. When the switch is thrown to the left, only one circuit is established; between contact blade 47 and its companion contact L. This circuit includes a volume control device 51 in circuit with the cathode of tube 58. By placing a standard coil in the position as shown at 43, the volume control device 51 can be so adjusted as to provide a suitable scale reading on the instrument 40. When receiving the effects of the second harmonic from the oscillator tube 56 it will, of course, be understood that the various tuning condensers in the network will be adjusted to provide a resonant condition at the second harmonic of the oscillator frequency. If then the knob 45 is turned to the right, the switch blade 46 contacting with its companion contact R will add capacitance 52 to the tank circuit between the oscillator and the first stage of amplification; and likewise an additional capacitance 53 is added to the tank circuit between the amplifier 58 and the detector 58a, this being accomplished by closing of contact blade 49 against its companion contact R. A still further capacitor 54 is added to the tank circuit in the last stage. In series with the inductance leg of this stage I preferably dispose a meter 40.

It will be seen that by the addition of these capacitors 52, 53 and 54, in their respective stages, the network becomes tuned to the fundamental frequency of the oscillator, whereas it was first tuned to the second harmonic thereof. Accordingly, means are provided for including a transformer coil 43 (whether a standard or a coil to be matched therewith) in a tank circuit adapted to resonate at either the second harmonic or the fundamental frequency aforesaid. Resonance at the second harmonic is obtained by tuning the condenser 62, which alone is in shunt with the secondary of the transformer when the switch knob 45 is turned to the left. Two other condensers 59 and 60 may be added, however, and both are put in parallel with condenser 62 by closing the switch blade 48 against its companion contact R.

Condenser 59 is preferably of greater value than condenser 60, the latter being a trimmer condenser having a scale 61 and pointer disposed in relation to the tuning knob thereof so as to determine relative departures from a normal setting.

All of the controls for the test set illustrated in Fig. 2 (with exceptions hereinafter noted) are preferably disposed within the cabinet and out of reach of the operator who is to test successive coils that are being manufactured on a quantity production basis. The only controls that he uses are the switch knob 45, and the knobs for tuning condensers 60 and 62.

In order to better understand the theory of operation and the utility of my novel test set it should be noted that as I introduce successively a plurality of coils into the network at the position 43, and then adjust the tuning condenser 62 for maximum response at the second harmonic of the oscillator, the switch knob 45 being turned to the left, it matters not if slight variations in the distributed capacity of the respective coils occur and are compensated for by varying the setting of the tuning condenser 62. The important consideration is that for any particular coil I should note the difference between two capacitances, each required for producing a resonant tank circuit at one and the other of two frequencies respectively. The testing of each coil will be made at an harmonic and then at the fundamental frequency of the fixed oscillator. The standard conditions of resonance will be pre-adjusted in the set when a standard coil has been introduced at 43 and the supervising engineer can adjust the between-stage condensers and the condenser 59 to suitable values.

The reason for obtaining a measurement of capacity differences as an index of inductance values is that for any given inductance L which is introduced into one and then the other of two tank circuits having capacitances $C_1$ and $C_2$ respectively, $$L = \frac{(f_1^2 - f_2^2)K}{f_1^2 f_2^2 (C_2 - C_1)} \qquad (1)$$

where $f_1$ and $f_2$ are the two frequencies at which the tank circuits are respectively resonant. Now since the oscillator of my test set produces a fixed fundamental frequency, its second harmonic will also be fixed and $$\frac{f_1^2 - f_2^2}{f_1^2 f_2^2}$$

becomes a constant. On the right hand side of Equation (1), therefore, the only variable factor is $(C_2 - C_1)$, and L must vary in inverse proportion thereto.

In view of the above argument it will be clear that my test set is suitable for matching impedances when the following procedure is carried out:

1. With the standard coil in place at 43, set condenser 60 at the midway position of the scale 61, turn switch knob 45 to the left and tune the set to the second harmonic of the oscillator frequency. This tuning will require adjustment of condensers 62, 63, 64 and 65.

2. When deriving maximum output, adjust the volume control 51 to obtain a convenient instrument reading on the scale of the microammeter 40.

3. Turn switch knob 45 to the right and adjust condensers 52, 53, 54 and 59 to give maximum output.

4. Adjust the volume control 57 to obtain a convenient instrument reading on the scale of the microammeter 40 when the set is tuned to the fundamental frequency of the oscillator.

The cabinet may now be closed up and the standard coil replaced by successive coils to be matched therewith.

Assuming now that a coil of unknown characteristics has been inserted in the jig the connections for which are shown at 43, the distributed capacity of the tested coil, if different from that of the standard coil can be compensated for by adjustment of the condenser 62, (switchknob 45 being turned to the left for harmonic frequency tuning) so as to give maximum response. Then upon turning the switch knob 45 to the right for introducing the interstage capacitances, including condensers 52, 53, 54, 59 and 60, whereby the fundamental frequency is tuned in, it will be noted whether maximum response is obtained by adjustment of the trimmer condenser 60 one way or another. If adjusted to increase the capacity, that means that the inductance value of the coil is too low compared with the standard. If the trimmer condenser needs adjustment the other way, an excess value of coil inductance will be manifested. If the departure from standard is within such limits as are permissible, that fact will be noted by relatively small movements of the condenser 60 in order to bring about maximum response. If the departure from resonance is greater than the fixed tolerances, the coil will need to be adjusted and again tested both at the harmonic and the fundamental frequencies of the oscillator.

From the foregoing it will be observed that I have provided a device and a method for testing inductance coils such that the coil may be subjected to the same conditions of operation as would obtain when these coils are built into the sets in which they are to operate. Furthermore, I have provided means for eliminating the factor of uncertainty which existed under formerly used methods of test, particularly in respect to the distributed capacity of the coil itself. According to the prior practice, it was commonly considered sufficient to test the coil at some frequency far below the range of frequencies in which it was intended eventually to be operated. The response characteristics under such conditions could not be properly compared with the conditions under which the coil would eventually be put in service. The reactance of the coil at one frequency gave no accurate indication of what its response characteristics would be at another frequency. When, however, the coil is tested at two selected frequencies, both of which are included in or near the frequency band for which the coil is intended, it is obvious that adjustments may be readily made to bring the coil itself up to the required standard.

I have disclosed herein certain specific means for accomplishing the objects of my invention. By two modifications of my invention I have illustrated how my objects may be attained, both with respect to the means employed and with respect to the process of testing transformers and inductance coils generally. It will be understood that the foregoing disclosure is more or less exemplary, and is not to be construed as limiting the scope of my invention. Other modifications will suggest themselves to those skilled in the art. My invention, therefore, is not to be limited except insofar as is necessitated by the prior art and by the spirit of the appended claims.

I claim as my invention:

1. Apparatus for matching the effective inductance of one impedance to that of another comprising an electron tube network having means for generating oscillations, tuning and switching means for including first one and then the other of said impedances in said network for fixing the resonant characteristics thereof at a frequency harmonically related to the fundamental frequency of said oscillation generating means, and means including an additional tuning device and a switch for connecting the same into said network whereby the two said impedances may be compared at said fundamental frequency.

2. Apparatus in accordance with claim 1 characterized in that the means for generating oscillations comprises two oscillators and the network is adapted to heterodyne the output of one oscillator with that of the other to produce at times an audible beat note and at times a zerobeat frequency.

3. Apparatus in accordance with claim 1 characterized in that an indicator is provided for indicating the resonant characteristics of the network at the fundamental frequency and at the chosen harmonic frequency of said oscillation generating means.

4. In a device of the class described, an oscillation generator, an electron tube network coupled to said generator and adapted to amplify the output energy thereof, a radio frequency transformer having standard characteristics, a second radio frequency transformer the characteristics of which are to be compared with said standard, means including suitable electrical connections with said network whereby said transformers may be interchangeably held in a predetermined position of orientation with respect to said network and similarly connected thereto, means for tuning said network alternatively to an harmonic frequency of said generator and then to the fundamental frequency thereof, and means for visually indicating a resonant condition of said network or departures therefrom as said transformers are respectively connected.

5. In a device of the class described, a pair of oscillation generators, means including an electron tube network for heterodyning output energy from the two said generators, a plurality of supposedly similar impedances the inductive characteristics of which are to be compared, means for interchangeably connecting said impedances in circuit with said network, paired tuning means symmetrically disposed and adapted to cooperate on the one hand with a particular one of said impedances chosen as a standard and on the other hand with another of said impedances intended to be matched with the standard so as to afford alternatively a like tank-circuit reactance in said network, means for tuning said network alternatively to either of two frequencies capable of being sustained by the fixed frequency of one of said generators, and means audibly responsive to the heterodyning of said generators when a desired condition of resonance of said network is approached.

6. A device in accordance with claim 5 comprising a multipole double-throw switch for alternately interposing in said network at one time the standard impedance together with the tuning means on the one hand with which it forms a tank circuit, and at another time the impedance to be matched with the standard together with the tuning means of the other hand with which the impedance to be matched forms a tank circuit.

7. The method of matching one inductance against another which comprises generating oscillations at a frequency approximated by the lower range of frequencies for which one of said inductances is intended to be used, providing two like conditions of tank-circuit resonance the capacitance of each of which depends upon one and the other of said inductances respectively for absorbing a peak amount of energy of the second harmonic of the oscillations generated, measuring the energy so absorbed in each case, and then modifying the conditions of tank-circuit resonance by the addition of sufficient capacity to absorb a peak amount of energy of the fundamental frequency of said oscillations, if said inductances are matched.

8. The method of matching one inductance against another which comprises generating oscillations at a substantially fixed frequency within the lower range of frequencies for which one of said inductances is intended to be used, providing two like conditions of tank-circuit resonance the capacitance of each of which depends upon one and the other of said inductances respectively for absorbing a certain amount of energy at a frequency equal to the second harmonic of the oscillations generated, generating from a second source oscillations the frequency of which is determined at one time by one of said conditions of tank-circuit resonance and at another time by the other of said conditions, causing the energies from the two sources of oscillations to be heterodyned one with the other, observing the audible beat frequency note thus obtained and reducing it to a zero-beat frequency, first with respect to one of said inductances and then with respect to the other, and finally modifying the conditions of tank-circuit resonance by the addition of sufficient capacity to produce oscillations from the second source at substantially the fundamental frequency first mentioned, whereby the characteristics of said inductances may be matched if a zero-beat frequency is then obtained in respect to each of said inductances.

9. The method of measuring and matching inductances in a plurality of supposedly similar high frequency coils, which comprises impressing first one frequency and then another across the terminals of said coils, providing a condition of tank-circuit resonance in each case and noting the value of the capacitance required to resonate each of said inductances at the lower of the two frequencies in addition to the capacitance required for tank-circuit resonance at the higher of said frequencies, variations in said difference of capacities at the two said frequencies constituting a measure of difference between the inductance values of the several coils.

WILLIAM H. CONRON.